United States Patent Office 3,387,593
Patented June 11, 1968

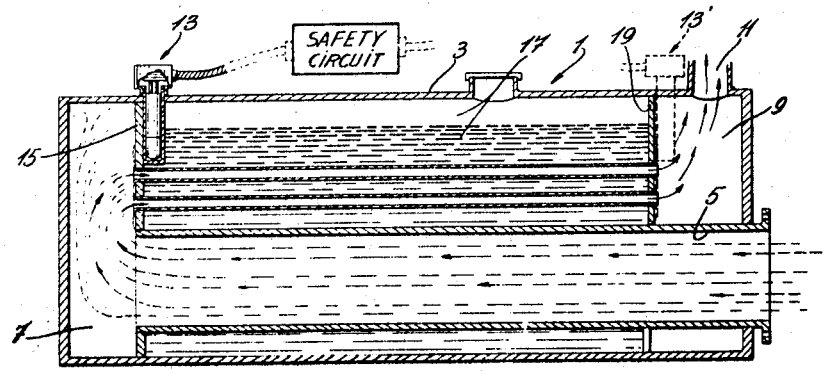
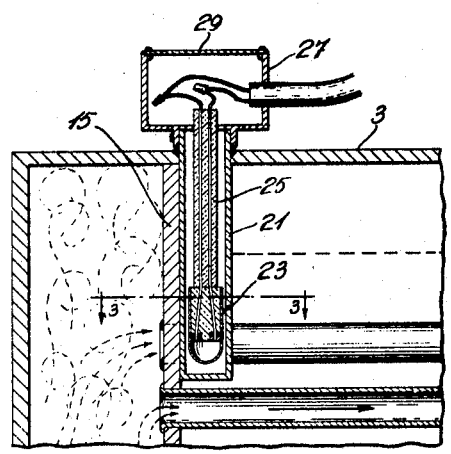
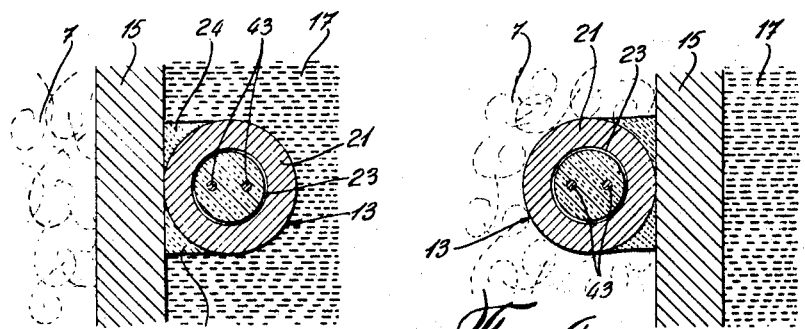
INVENTOR
Roch H. GINGRAS
BY
ATTORNEYS

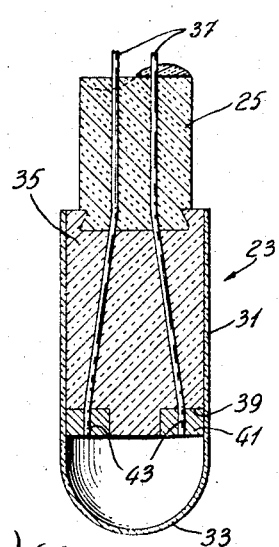
Fig. 5
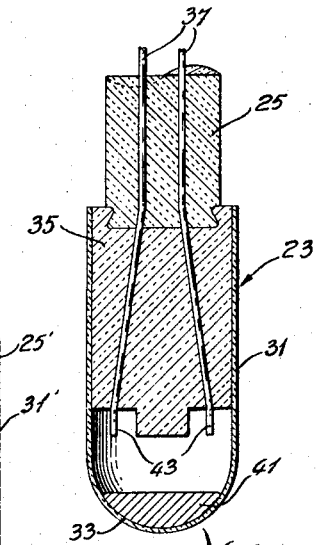
Fig. 6
Fig. 7
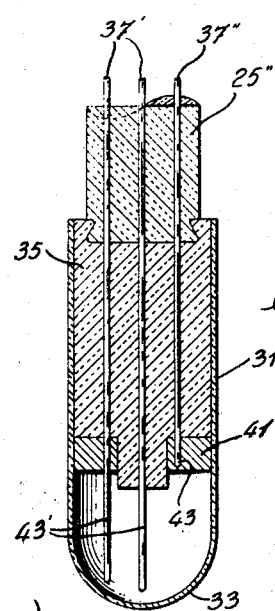
Fig. 8
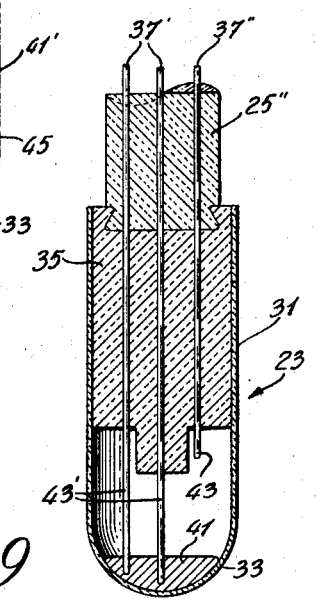
Fig. 9

3,387,593
SAFETY DEVICE FOR FIRED PRESSURE
VESSELS
Roch Henri Gingras, 970 Vanier St., St-Laurent,
Quebec, Canada
Filed Mar. 3, 1966, Ser. No. 531,523
12 Claims. (Cl. 122—504.1)

ABSTRACT OF THE DISCLOSURE

A safety device for detecting overheat in a fired pressure vessel formed of a container having the shape of a well and made of heat conducting material whereby to act as a heat transfer member. The container is mounted in direct contact with the heating surface of the fired pressure vessel and extends to and through the outer shell of the vessel. A heat sensitive element is loosely mounted in the container and is removable through the outer shell. The heat sensitive element is responsive to detect overheat upon a predetermined temperature rise in the fired pressure vessel.

---

The present invention relates to a safety device for detecting a low liquid level condition or a lack of circulation of a gas being heated in a heat exchanger to prevent overheating thereof. In a specific application, as herein described, the device of the invention is a low water cut-off for water-uontaining boilers, that is, hot water or steam boilers.

A first dpressure vessel is a vessel for heating a fluid under pressure and for the purpose of the instant specification, it is a vessel in which a fluid is heated through a heating surface, the heating medium being on the side of the heating surface opposite that of the fluid being heated.

In the latter application, it is well known that the greatest accident producer is a low water condition that results in overheating and loosening of tubes, collapse of the furnace and in some cases, complete destruction of the boiler. In certain classes of boilers, the result is a disastrous explosion that causes serious loss. This is true despite the fact that all boilers are provided with a low water cut-off. This is due to the fact that the latter is a mechanical device that may fail at any unexpected time, if not properly and regularly inspected, mostly due to the formation of scale in the moving parts thereof.

Even when the L.W.C.O. is duly attended and frequently inspected, any repair or general inspection that is to be carried out requires that the pressure in the boiler be first let off and then that the boiler be emptied of water.

Rather than relying on the level of the water itself as is the case with the present L.W.C.O., I have found that the above disadvantages and danger hazards can be prevented by detecting the effects of overheat rather than a lack of water, or of gas if the fired pressure vessel is for heating a gas. More specifically, the safety device of the invention for detecting overheat generally comprises a heat sensitive detector mounted in a container made of heat conductive material located in direct contact with the heating surface of the vessel or boiler, said heat sensitive detector being responsive to detect overheat upon a predetermined temperature rise in said fired pressure vessel. In a preferred embodiment of the heat sensitive detector contains an element made of electrically conductive material that is fusible in response to the predetermined temperature rise in the container. A pair of electrical conductors having spaced ends is embedded in the fusible material so that when the liquid drops below the permissible level, the temperature in the container rises since it is in direct contact with the heating surface and the fusible material melts and separates from the conductors ends. This reaction is used either to actuate an alarm device or cut off the fuel supply or both.

There is therefore nothing mechanical in the device and it will always respond to a predetermined increase in temperature. The heat sensitive detector is located within a container or well that extends outside the boiler shell to be readily accessible without having to drop the pressure in the boiler or drain it. In fact, the device could be jumped in the safety circuit to allow for inspection and repair and the boiler operated without it provided there is proper attendance of the boiler until the device is placed into service again. It should also be noted that the detector is at all time out of contact with the medium being heated and is consequently not affected by scale. In fact it would help the operation of the overheat detector rather than hinder it as is presently the case with the mechanically operated devices. It should be appreciated that the accumulation of scale on the side of the detector container exposed to the medium being heated will act as an insulator thus increasing the temperature inside the container made of insulating material; it being noted that the container is secured in direct contact with a heating surface. Therefore, the said container may be considered as a heat conducting hollow fin. A condition of overheat would consequently be created which would be detected by the detector which reaction could in turn be used to sound an alarm or cut off the fuel supply or both depending on the reaction desired.

As an auxiliary feature, the overheat detector can thus serve as indicator of the scale in the boiler.

This is an important advantage, as said above, over existing L.W.C.O. systems wherein the presence of scale eventually prevents the operation of the mechanically moving parts.

Furthermore, the heat sensitive element is contained in a holder and when melting, it falls at the bottom thereof so that the detector may be reused simply by heating the meltable material and inverting the holder so that it will freeze around the conductors ends again.

It is believed that a better understanding of the invention will be afforded by the description that follows having reference to the appended drawings wherein:

FIG. 1 is a longitudinal cross-sectional view of a fire-tube boiler equipped with the safety detecting device of the invention;

FIG. 2 is a cross-sectional view, on a larger scale, of the portion of the fire-tube boiler of FIG. 1 where the safety device is located;

FIG. 3 is a cross-sectional view taken along line III—III of FIG. 2;

FIG. 4 is a view similar to that of FIG. 3 but showing the safety detecting device on the gas side or heating side of the heating surface;

FIGS. 5, 6, 7, 8 and 9 are longitudinal cross-sectional views of various embodiments of the safety detecting device of the invention.

FIG. 1 illustrates a conventional fire-tube boiler having an outer shell 3, a furnace tube 5, a front smoke box 7, a rear smoke box 9 and a smoke outlet 11. The safety detecting device 13 of the invention is shown mounted in immediate contact with a heating surface 15 separating the front smoke box 7 from the water and steam space 17. It will be understood that the safety detecting device 13 may be mounted on the heating surface 19 in the rear smoke box 9 as shown at 13'.

With reference to FIGS. 2 and 3, the safety detecting device of the invention comprises a cylindrical container or well 21 secured to the heating surface 15 by welding 24 in such a manner as to obtain the maximum heat transfer by conduction between the front smoke box 7 and the water space 17 through the container 21. In other words, the well 21 may be considered as a heat transfer hollow member or fin.

A heat sensitive detector 23 is loosely received within the tubular container 21 but in close spatial relationship therewith so as to ensure the maximum heat transfer by conduction between container 21 and detector 23. The latter hangs from a heat-resisting cable 25 secured, in any known manner, to and extending through the bottom of a conventional junction box 27 removably fixed to the container 21. It will be noted that the latter extends through the boiler shell 3 and is secured thereto as by welding whereby to provide a pressure-tight connection.

Alternatively and as shown in FIG. 4, the safety detecting device could be mounted on the gas or heating side 7 of the heating surface 15, that is, in the front smoke box 7.

Three different embodiments of the detector 23 are shown in FIGS. 5 through 9.

In the embodiment illustrated in FIGS. 5 and 6, detector 23 comprises a tubular holder 31 made of electrically insulating material and having one rounded closed end 33 and an open end closed by a plug 35 of electrically insulating material, preferably ceramic material. Electrical cable 25 is connected to this ceramic plug 35 in any known manner such as the one illustrated in FIGS. 5 and 6.

Ceramic plug 35 has a circular groove 39 at the end thereof within holder 31. A ring 41 of the fusible material is nested in the said groove 39.

Electrical cable 25 has two conductors 37 having two protruding ends extending across plug 35 with the spaced leads 43 thereof embedded in the ring 41 of fusible material.

Ring 41 is made of any suitable material having a melting point slightly above the temperature of the liquid being heated in which it bathes as shown in FIG. 1. This temperature will of course vary according to the operating conditions of the fired pressure vessel. In the case of the steam boiler or generator under consideration, it will of course depend on the pressure of the steam produced.

Strictly from the point of view of safety, the location of the detector as well as the melting point of ring 41 need not be accurately determined. Indeed, the temperature may reach 1000° F. before the metal is affected or damaged and a high pressure welded boiler shell, built according to the ASME pressure vessel code, is subjected to a temperature of 1200° F. during annealing where internal stresses disappear and there is no external deformations.

Also, at the regions where the overheat detector would normally be located, the heating surface rarely exceeds 350° F. when submerged, even in high pressure boilers.

Consequently, this leaves a considerable working margin, so that a single detector built to react at 500° F., for instance, would be suitable to meet most conditions without having to take particular care in locating it.

The operation of the safety detecting device of the invention is now obvious. Detector 23 is slipped into the container or well 21 until the heat-sensitive element or ring of fusible material 41 is located at the permissible low-water level. Should the water level in the boiler drop below this permissible level, the temperature within the container 21 will rise rapidly and cause melting of ring 41, the material of which will drop at the bottom end 33 of the holder 31 as shown in FIG. 6. This will cause electrical disconnection between the two leads 43, which condition can serve to actuate a safety circuit as shown in FIG. 1 or deenergize a fuel supply equipment. The specific details of the safety circuit or fuel supply equipment need not be given here as they are well known in the art.

It will be noted that the safety device of the invention is extremely simple in use and can be taken out of its container without having to shut down the boiler. Also, it can be reused time and again simply by inverting the detector 23 to force the melted material back into groove 39.

In the embodiment illustrated in FIG. 7, the tubular holder 31' is longer and is firmly held against the end of the electrical conduit 25' in any known manner after the plug 35' of insulating material has been inserted in the holder 31'. Also, plug 35' is formed with an end chamber 45 for the reception of the fusible material 41'. In this embodiment, the tubular holder 31' can be made of metal since it will be insulated from the electrical leads 43. The operation of this embodiment is identical to that of FIGS. 5 and 6.

The detecting device illustrated in FIGS. 8 and 9 is generally similar to that of FIGS. 5 and 6 except that in this case, cable 25'' contains three conductors, two long ones 37' extending to the bottom of the tubular holder 31 and a short conductor 37'' ending in the heat sensitive element or ring 41 of fusible material. With a detecting device according to this embodiment, the short conductor 37'' and one long conductor 37' can be connected in the fuel supply circuit while the two long conductors 37' can be connected to an alarm circuit which, as can be seen from FIG. 8 would normally be open. After the heat sensitive element 41 has melted and fallen at the bottom of the holder 31, the two leads 43' become short circuited and the alarm is sounded, while the fuel supply equipment circuit is broken thus cutting out the fuel supply to the furnace.

Although the specific embodiment described above relates to a fire tube boiler for the production of steam, it will be understood that the device can apply to a hot water boiler and generally to any fired pressure vessel wherein a predetermined liquid level is to be maintained. Similarly, although the embodiment was restricted to the use of hot gases as a heating medium, it will be understood that the latter can also be a liquid.

It has been pointed out that the heat sensitive detector or cell 23 is reusable and that it is called upon to open a live electrical circuit. It is therefore suggested that air within the cell be replaced by a rare gas, whereby to reduce oxidation to a minimum.

I claim:

1. In a fired pressure vessel having an outer shell, a safety device for detecting overheat subsequent to the surface of the liquid being heated falling below a predetermined permissible level, the combination comprising:
   (a) a container made of heat conducting material to act as a heat transfer member and extending to and through said outer shell, said container mounted in direct contact with a heating surface of said vessel and closed with respect to said liquid being heated;
   (b) a heat sensitive element loosely mounted in said container and removable through said shell; said heat sensitive element located in the vicinity of said permissible level and above the bottom of said container, said element made of an electrically conductive material fusible in response to the temperature rise in said container subsequent to the liquid being heated falling below the said permissible level;
   (c) a pair of electrical conductors having spaced ends embedded in said fusible material so constructed and arranged that when said liquid being heated drops below said permissible level, the temperature in said container rises and said fusible material melts and separates from said conductors to free said conductors spaced ends from electrical connection therebetween.

2. A combination as claimed in claim 1, wherein said container is on the heated side of said heating surface.

3. A combination as claimed in claim 1, wherein said container is on the heating side of said heating surface.

4. A combination as claimed in claim 1, wherein said heat sensitive element and said conductors are parts of an assembly loosely mounted in said container and removable therefrom through said shell; said assembly including a tubular holder closed at one end and a plug of electrically insulating material closing the other end; said conductors extending across said plug and having said spaced ends projecting from said plug in said holder to terminate short of said one closed end; said heat sensitive element normally interconnecting said projecting ends and so constructed and arranged that when melting, it falls at the said one closed end of said holder free from said conductors ends which become disconnected.

5. A low water cut-off for a water-containing boiler having an outer shell to detect overheat thereof subsequent to the surface of the water in the boiler falling below a predetermined permissible level, the combination comprising:
  (a) a container made of heat conductive material to act as a heat transfer member and extending to and through said outer shell, said container mounted in direct contact with a heating surface of said boiler and closed with respect to the water in said boiler;
  (b) a heat sensitive element loosely mounted in said container and removable through said shell, said heat sensitive element located in the vicinity of said permissible water level and above the bottom of said container, said element made of an electrically conductive material fusible in response to the temperature rise in said container subsequent to the water surface falling below said permissible level;
  (c) a pair of electrical conductors having spaced ends embedded in said fusible material and so constructed and arranged that when the water surface drops below said permissible level, the temperature rising in said container melts said fusible material element to separate it from said conductors spaced ends to break electrical connection therebetween.

6. A low water cut-off as claimed in claim 5, wherein said container is on the heated side of said heating surface.

7. A low water-cut off as claimed in claim 5, wherein said container is on the heating side of said heating surface.

8. A low water cut-off as claimed in claim 6, wherein said fusible material element and said conductors are parts of an assembly loosely mounted in said container and removable therefrom through said shell; said assembly including a tubular holder closed at one end and a plug of electrically insulating material closing the other end; said conductors extending across said plug and projecting away therefrom short from said one closed end of said holder; said fusible material element normally interconnecting said conductors projecting ends and so constructed and arranged that when melting, it falls on the said one closed end of said holder free from said conductors ends which become disconnected.

9. A low water cut-off as claimed in claim 6, wherein said fusible material element and said conductors are parts of an assembly loosely mounted in said container and removable therefrom through said shell; said assembly including a tubular holder closed at one end and a plug of electrically insulating material closing the other end; a further electrical conductor; said three conductors extending across said plug and projecting away therefrom; one of said conductors terminating short of said one closed end and the other two conductors terminating at said one closed end to form one short and two long conductors; said fusible material element normally interconnecting the short and one of the long conductors only and so constructed and arranged that when melting, it falls on the said one closed end of said holder free from said short conductor but still interconnecting the remaining two long conductors.

10. A low water cut-off as claimed in claim 8, wherein said two conductors are parts of a heat resistive electrical cable extending out of said container through said shell.

11. A low water cut-off as claimed in claim 9, wherein said three conductors are parts of a heat resistive electrical cable extending out of said container through said shell.

12. In a fired pressure vessel for heating a fluid and having an outer shell, a safety device for detecting overheat therein, the combination comprising:
  (a) a container made of heat conducting material to act as a heat transfer member and extending to and through said outer shell, said container mounted in direct contact with a heating surface of said vessel and closed with respect to said fluid being heated, and
  (b) a heat sensitive element loosely mounted in said container and removable through said shell; said heat sensitive element responsive to detect overheat upon a predetermined temperature rise in said vessel.

References Cited
UNITED STATES PATENTS

| | | | |
|---|---|---|---|
| 1,048,659 | 12/1912 | Claus | 122—504.1 XR |
| 1,907,845 | 5/1933 | Macrae et al. | 200—142 |
| 1,949,724 | 3/1934 | Lipman | 200—142 XR |

KENNETH W. SPRAGUE, *Primary Examiner.*